T. F. WOODWARD.
Fruit-Jar.
No. 198,528.        Patented Dec. 25, 1877.
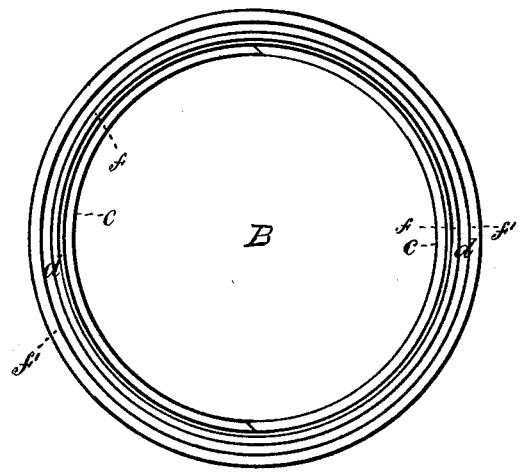
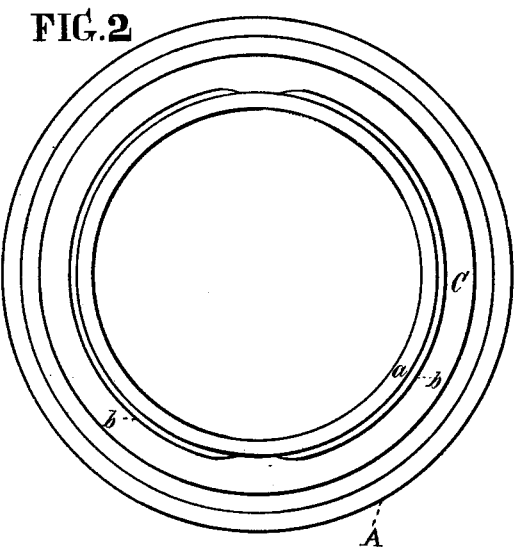
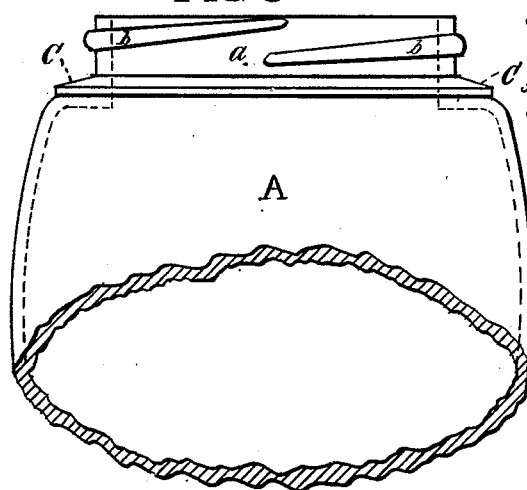
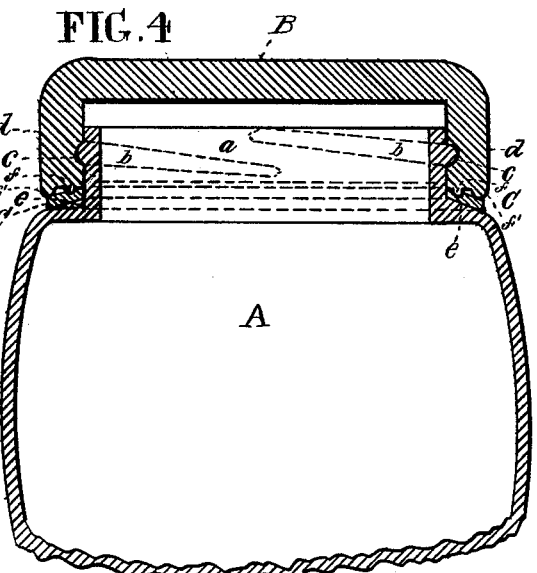
Witnesses
Thomas J. Bewley.
Herman Koecher.
Inventor
Theodore F. Woodward
per Stephen Ustick, Attorney

UNITED STATES PATENT OFFICE.

THEODORE F. WOODWARD, OF WINSLOW, NEW JERSEY, ASSIGNOR TO HAY & CO., OF SAME PLACE.

IMPROVEMENT IN FRUIT-JARS.

Specification forming part of Letters Patent No. 198,528, dated December 25, 1877; application filed November 16, 1877.

*To all whom it may concern:*

Be it known that I, THEODORE F. WOODWARD, of Winslow, in the county of Camden and State of New Jersey, have invented a new and useful Improvement in Fruit-Jars, which improvement is fully set forth in the following specification and the accompanying drawings, in which—

Figure 1 is a bottom view of the cover. Fig. 2 is a top view of the jar with the cover removed. Fig. 3 is a side elevation of the same. Fig. 4 is a vertical section of the jar with the cover in position.

Like letters of reference in all the figures indicate the same parts.

The nature of my invention consists of a glass cover having a downwardly-projecting rim provided with inclines, sunk in its inner periphery at opposite sides, and terminating at a beaded angular edge of the rim, in combination with the neck of a jar, having corresponding inclines projecting from its outer surface. The edge of the rim is brought to bear upon a gasket, which is seated upon a shoulder at the lower end of the neck.

In the accompanying drawings, A represents a fruit-jar, and B the cover. The neck $a$ of the jar has inclines $b\ b$ at opposite sides, which project from its circumferential surface, and the cover B corresponding inclines $c\ c$, sunk in the inner surface of its rim $d$, and terminating at its lower edge, which bears upon the gasket C, that is seated on the shoulder $e$ of the neck $a$, as seen in Fig. 4. The lower edge of the rim $d$ inclines upward from its outer to its inner surface, and has annular beads $f f'$. These beads serve the purpose of causing the edge of the rim to be seated easily upon the gasket C, and counteract the tendency of the latter being drawn around in the screwing down of the cover, which is incidental to the screwing down of a cover when the edge has a flat surface. The beveled edge of the cover, whereby the outer bead $f'$ is brought lower than the inner bead, inclines the gasket to the neck of the jar, and prevents its being pressed outward, and thus gives efficiency to the sealing.

I claim as my invention—

The cover B, having a rim, $d$, with inclines $c\ c$ sunk in its inner surface at opposite sides, and a beveled or inclined edge running from the outer to the inner surface of the rim, with annular bead $f f'$, in combination with the jar A, having inclines $b\ b$ projecting from the outer surface of the neck $a$, and with the gasket C, seated on the shoulder $e$ of the neck, substantially as and for the purpose set forth.

THEODORE F. WOODWARD.

Witnesses:
B. C. VANAMAN,
GEO. F. PFISTERER.